United States Patent
Lee et al.

(10) Patent No.: US 11,592,342 B2
(45) Date of Patent: Feb. 28, 2023

(54) TEMPERATURE DETECTION DEVICE

(71) Applicant: KCTECH CO., LTD., Gyeonggi-do (KR)

(72) Inventors: Jae Won Lee, Seoul (KR); Ju Young Lee, Gyeonggi-do (KR); Kyung Cheol Jeong, Chungcheongbuk-do (KR); Jun Ho Lee, Gyeonggi-do (KR); Yong Guk Park, Gyeonggi-do (KR)

(73) Assignee: KCTECH CO., LTD., Gyeonggi-do (KR)

( * ) Notice: Subject to any disclaimer, the term of this patent is extended or adjusted under 35 U.S.C. 154(b) by 291 days.

(21) Appl. No.: 16/823,705

(22) Filed: Mar. 19, 2020

(65) Prior Publication Data

US 2020/0300716 A1 Sep. 24, 2020

(30) Foreign Application Priority Data

Mar. 22, 2019 (KR) ........................ 10-2019-0033086

(51) Int. Cl.
*G01K 13/02* (2021.01)
*G01K 1/14* (2021.01)
*G01K 1/143* (2021.01)

(52) U.S. Cl.
CPC .............. *G01K 13/02* (2013.01); *G01K 1/14* (2013.01); *G01K 1/143* (2013.01); *G01K 13/026* (2021.01)

(58) Field of Classification Search
CPC ........... G01K 13/02; G01K 1/14; G01K 1/143
USPC ................................ 374/208, 141, 147, 163
See application file for complete search history.

(56) References Cited

U.S. PATENT DOCUMENTS

| | | | | |
|---|---|---|---|---|
| 2,195,228 A | * | 3/1940 | Schwarz | F25B 5/00 62/113 |
| 5,335,508 A | * | 8/1994 | Tippmann | F25B 7/00 62/305 |
| 2011/0183073 A1 | | 7/2011 | Sato et al. | |

FOREIGN PATENT DOCUMENTS

| | | | |
|---|---|---|---|
| JP | H07335537 A | | 12/1995 |
| KR | 20030060223 A | | 7/2003 |
| KR | 20100042870 A | * | 4/2010 |
| KR | 20100055121 A | | 5/2010 |
| KR | 20200112496 A | * | 10/2020 |
| TW | 201742176 A | | 12/2017 |

* cited by examiner

*Primary Examiner* — Mirellys Jagan
(74) *Attorney, Agent, or Firm* — KDB Firm PLLC

(57) ABSTRACT

Disclosed is a temperature detection device. The device for detecting temperature of a processing liquid for substrate processing according to an embodiment includes a temperature measurement sensor installed adjacent to an outer surface of a tube through which the processing liquid flows, in which the temperature measurement sensor senses the temperature of the processing liquid in the tube.

8 Claims, 5 Drawing Sheets

TEMPERATURE DETECTION DEVICE

CROSS-REFERENCE TO RELATED APPLICATION(S)

This application claims the benefit of Korean Patent Application No. 10-2019-0033086, filed on Mar. 22, 2019, in the Korean Intellectual Property Office, the disclosure of which is incorporated herein by reference.

BACKGROUND

1. Field of the Invention

Example embodiments relate to a temperature detection device.

2. Description of the Related Art

In general, semiconductors are manufactured by repeatedly performing a series of processes such as lithography, deposition, etching, and the like. Due to the repetitive processes, contaminants such as various types of particles, metal impurities, organic matter, or the like are left on the surface of a substrate constituting the semiconductors. The contaminants remaining on the substrate deteriorate the reliability of the semiconductors manufactured. Therefore, to address this problem, a substrate processing apparatus is employed in a semiconductor manufacturing process. The substrate processing apparatus processes the surface of the substrate by dispensing a processing liquid onto the substrate. At this time, the substrate processing apparatus heats the processing liquid as needed and uses the high-temperature processing liquid. The processing apparatus in the related art is formed in a structure in which the processing liquid is heated in advance and delivered to the substrate. The temperature of the processing liquid may have a direct influence on a semiconductor processing effect. In the related art, a method of brining a temperature sensor into direct contact with the processing liquid is used to measure the temperature of the processing liquid. However, this method has an adverse effect on semiconductor performance due to contamination of the processing liquid. Accordingly, a method for accurately detecting the temperature of the processing liquid while solving this problem is required.

The above background information was held or acquired by the inventor in the process of deriving the present invention, and cannot be necessarily regarded as well-known technology disclosed to general public before the application of the present invention.

SUMMARY

An aspect provides a temperature detection device for preventing contamination of a processing liquid in a temperature measurement process.

Another aspect also provides a temperature detection device for detecting accurate temperature while using an indirect measurement method.

According to an aspect, there is provided a device for detecting temperature of a processing liquid for substrate processing, the device including a temperature measurement sensor installed adjacent to an outer surface of a tube through which the processing liquid flows, in which the temperature measurement sensor senses the temperature of the processing liquid in the tube.

In an embodiment, the temperature measurement sensor may be installed on the outer surface of the tube so as to be disposed between different portions of the tube.

In an embodiment, the device may further include a connecting part having opposite sides connected to different portions of the tube, respectively, and the temperature measurement sensor may be disposed inside the connecting part.

In an embodiment, the connecting part may contain an epoxy material.

In an embodiment, the connecting part may connect the different portions of the tube such that the different portions adhering to the opposite sides of the connecting part and having lengthwise directions parallel to each other are spaced apart from each other.

According to another aspect, there is provided a device for detecting temperature, the device including: a tube through which a processing liquid for substrate processing flows; a jig having an outer circumferential surface around which the tube is wound, in which the jig maintains a shape of the wound tube portion in a predetermined state; and a temperature measurement sensor installed adjacent to an outer surface of the tube wound around the jig, in which the temperature measurement sensor senses temperature of the processing liquid flowing through the tube.

In an embodiment, the tube may be wound around an outer surface of the jig at least one time such that a plurality of different portions have lengthwise directions parallel to each other.

In an embodiment, the device may further include a connecting part having opposite sides connected to outer surfaces of different portions of the tube wound around the jig, and the temperature measurement sensor may be disposed inside the connecting part.

In an embodiment, the jig may include: a pair of support parts, each of which includes a curved surface, in which the pair of support parts are spaced apart from each other; and a bridge that connects the pair of support parts. The tube may be sequentially wound around the curved surfaces of the pair of support parts.

In an embodiment, the bridge may have a smaller width than the pair of support parts, and the tube may be spaced apart from the bridge in a state of being wound around the jig.

In an embodiment, the temperature measurement sensor may be installed on an outer surface of a tube portion located between the pair of support parts.

In an embodiment, each of the support parts may include a seating groove that is concavely formed along the curved surface and into which the tube is inserted.

In an embodiment, the support part may include a plurality of seating grooves formed thereon, and the seating grooves may be spaced apart from each other.

In an embodiment, the device may further include a heat-insulating housing containing a heat-insulating material, and the heat-insulating housing may surround the jig and the tube portion wound around the jig.

BRIEF DESCRIPTION OF THE DRAWINGS

These and/or other aspects, features, and advantages of the present invention will become apparent and more readily appreciated from the following description of example embodiments, taken in conjunction with the accompanying drawings of which.

DETAILED DESCRIPTION

Figure 1:
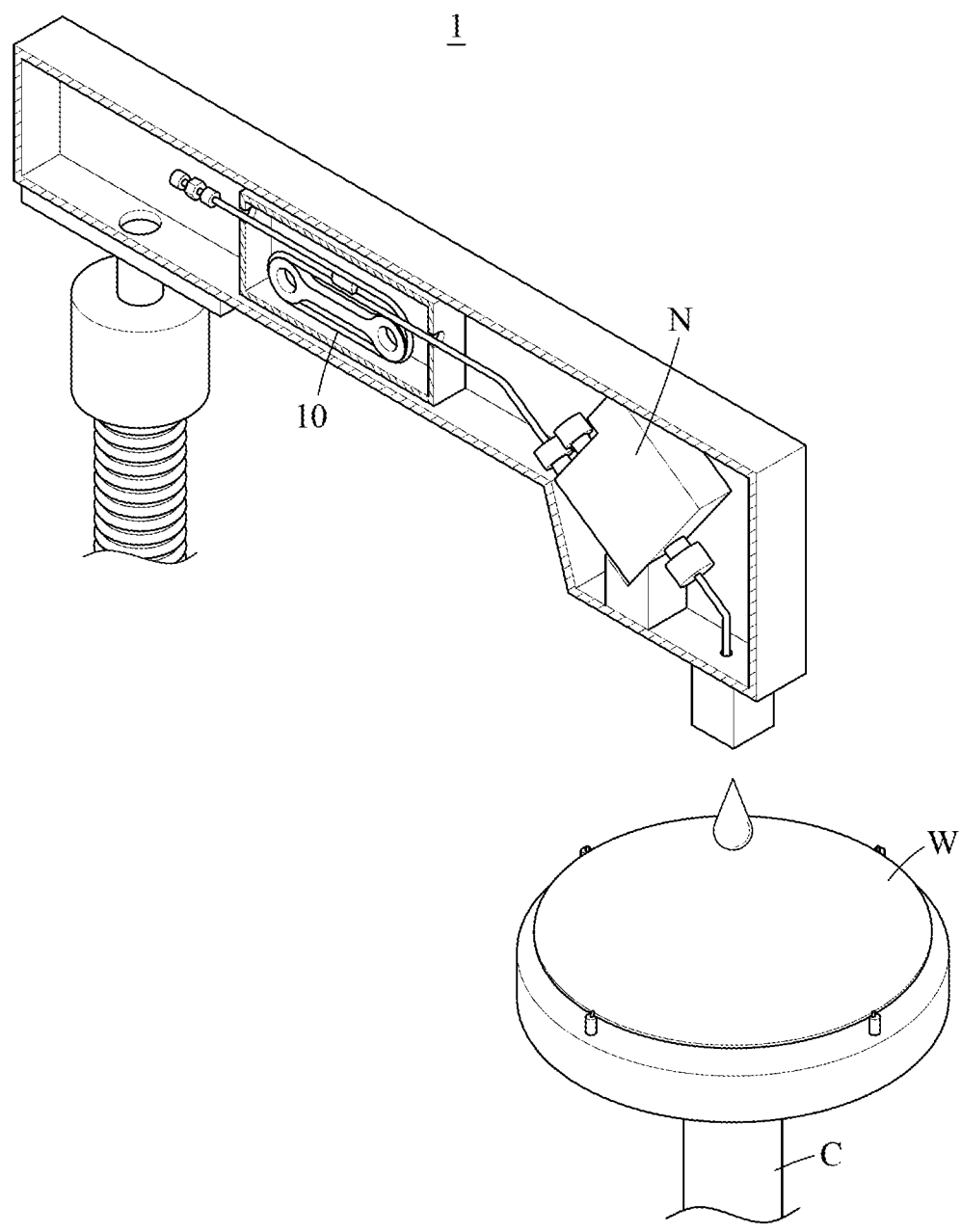
FIG. 1 is a schematic view of a processing liquid dispensing apparatus according to an embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present invention.

In describing the components of the embodiment according to the present invention, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked", but also are indirectly "connected", "coupled", or "linked" via a third component.

A component, which has the same common function as a component included in any one example embodiment, will be described using the same name in other example embodiments. Unless otherwise stated, the description set forth in any one example embodiment may be applicable to other example embodiments, and a detailed description will be omitted in an overlapping range.

FIG. 1 is a schematic view of a processing liquid dispensing apparatus according to an embodiment.

Referring to FIG. 1, the processing liquid dispensing apparatus 1 may dispense a processing liquid for processing a substrate W. The processing liquid dispensing apparatus 1 may be used to process the substrate W such as a semiconductor, a flat panel display, or a solar cell panel. The processing liquid dispensing apparatus 1 may dispense the processing liquid onto the substrate W rotating in a state of being seated on a carrier C. The processing liquid dispensing apparatus 1 may simultaneously dispense the processing liquid onto the total area of the substrate W through a nozzle N formed in a lengthwise direction. The processing liquid dispensed through the processing liquid dispensing apparatus 1 may include a material with high oxidizing power, which may be, for example, an acidic solution such as a sulfuric acid or a phosphoric acid.

The processing liquid may have processing performance, such as oxidizing power, which varies depending on temperature. Because the processing performance depending on temperature is adjusted depending on the type of the substrate W to be processed or a set polishing profile, the processing liquid needs to be dispensed onto the substrate W at a set temperature depending on a processing condition. Because the temperature of the processing liquid at the instant when the processing liquid is dispensed onto the substrate W directly affects the degree to which the substrate W is processed, the temperature of the processing liquid needs to be measured in real time.

In the case of directly detecting the temperature of the processing liquid for measurement of the accurate temperature of the processing liquid, a metal component of a temperature detection device may be melted in the processing liquid, and the melted metal may conversely contaminate the substrate W in a processing process. In contrast, in the case of indirectly measuring the temperature of the processing liquid, the temperature of the processing liquid may be inaccurately measured, which affects the processing performance.

The processing liquid dispensing apparatus 1 according to the embodiment may indirectly measure the temperature of the processing liquid that is dispensed onto the substrate W, thereby preventing contamination of the substrate W and ensuring temperature measurement performance close to the actual temperature of the processing liquid.

Figure 2:
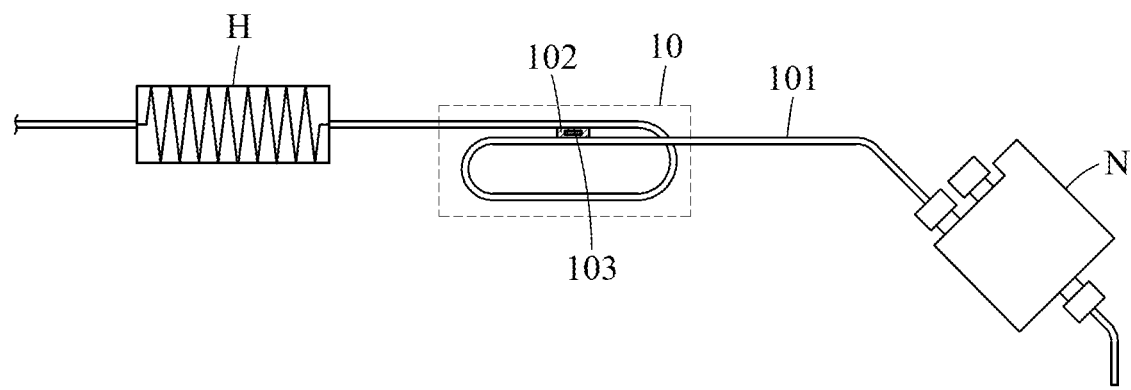
FIG. 2 is a schematic view of the processing liquid dispensing apparatus according to an embodiment.

FIG. 2 is a schematic view of the processing liquid dispensing apparatus 1 according to an embodiment.

Referring to FIG. 2, the processing liquid dispensing apparatus 1 may include a processing liquid supply unit (not illustrated), a tube 101, a heater H, the nozzle N, and a temperature detection device 10.

The processing liquid supply unit may supply the processing liquid into the tube 101. The processing liquid supply unit may include a processing liquid tank in which the processing liquid is stored and a hydraulic pump for forcing the processing liquid to flow. A plurality of processing liquid tanks may be provided for the respective types of processing liquids.

The tube 101 may be connected to the processing liquid supply unit. The tube 101 may extend from the processing liquid supply unit and may provide a flow path of the processing liquid. The tube 101 may contain a flexible material that is able to be bent. For example, the tube 101 may contain a material such as quartz, Teflon® PFA, or the like.

The heater H may heat the processing liquid. The heater H may be connected with the tube 101 or the processing liquid supply unit. The heater H may heat the processing liquid using, for example, microwaves. The microwaves generated from the heater H may pass through the tube 101 and may heat the processing liquid flowing through the tube 101. However, this is merely illustrative, and the heater H may include various means for heating the processing liquid.

The nozzle N may be connected to an end portion of the tube 101. The nozzle N may dispense the processing liquid from the tube 101 toward the substrate W. Whether to dispense the processing liquid, the amount of the processing liquid dispensed, the intensity at which the processing liquid is dispensed, or the like may be adjusted depending on operation of the nozzle N.

The temperature detection device 10 may detect the temperature of the processing liquid in the tube 101. The temperature detection device 10 may make contact with the outer surface of the tube 101 to indirectly measure the temperature of the processing liquid and ensure temperature measurement accuracy close to the actual temperature of the processing liquid.

Figure 3:
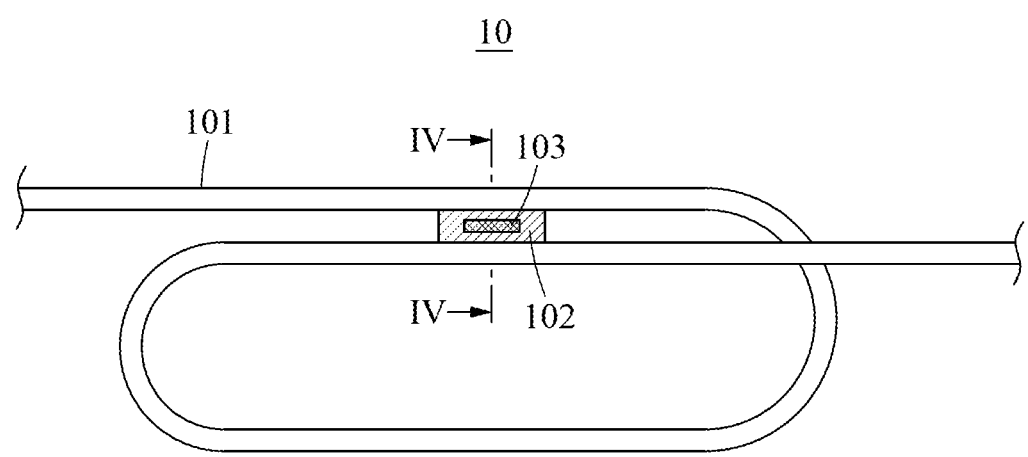
FIG. 3 is a schematic view of a temperature detection device according to an embodiment.
Figure 4:
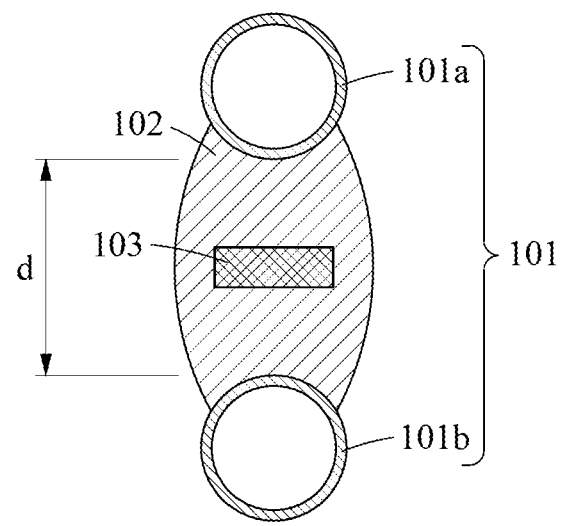
FIG. 4 is a sectional view taken along line IV-IV of FIG. 3.

FIG. 3 is a schematic view of the temperature detection device 10 according to an embodiment, and FIG. 4 is a sectional view taken along line IV-IV of FIG. 3.

Referring to FIGS. 3 and 4, the temperature detection device 10 according to the embodiment may detect the temperature of the processing liquid for substrate processing in real time. The temperature detection device 10 may include a connecting part 102 and a temperature measurement sensor 103.

The connecting part 102 may be connected to the tube 101. The connecting part 102 may make contact with outer surfaces of different portions of the tube 101. For example, the tube 101 may be bent such that two portions thereof are disposed side by side, and opposite sides of the connecting part 102 may adhere to outer surfaces of the two portions disposed side by side. The connecting part 102 may contain a material with high thermal conductivity, for example, an epoxy material. Hereinafter, for convenience of description, the two portions of the tube 101 with which the connecting part 102 is brought into contact are referred to as the first portion 101a and the second portion 101b.

The first portion 101a and the second portion 101b of the tube 101, which are connected through the connecting part 102, may be located side by side in a state of being spaced apart from each other at a predetermined interval. In this case, the interval between the two portions of the tube 101 may range from 2.3 mm to 2.7 mm. According to this range, the temperature measurement sensor 103, which will be described below, may be prevented from being damaged, and measurement accuracy close to the actual temperature of the processing liquid may be ensured. Alternatively, the two portions of the tube 101 may make contact with each other.

The temperature measurement sensor 103 may be installed adjacent to the outer surface of the tube 101. The temperature measurement sensor 103 may sense, in real time, the temperature of the processing liquid that flows through an adjacent tube portion. The temperature measurement sensor 103 may be disposed inside the connecting part 102. The temperature measurement sensor 103 may be located between the two portions of the tube 101 that adhere to the connecting part 102, that is, between the first portion 101a and the second portion 101b of the tube 101. The temperature measurement sensor 103 may measure the temperature of the processing liquid in the tube 101 by using heat transferred from the two portions of the tube 101.

According to this structure, the temperature measurement device 10 may have a simple application method in which the temperature measurement device 10 is directly attached to the outer surface of the tube 101, without a separate device for measuring the temperature of the processing liquid. Simultaneously, the temperature measurement device 10 may ensure temperature measurement accuracy close to the actual temperature of the processing liquid while indirectly measuring the temperature of the processing liquid.

Figure 5:
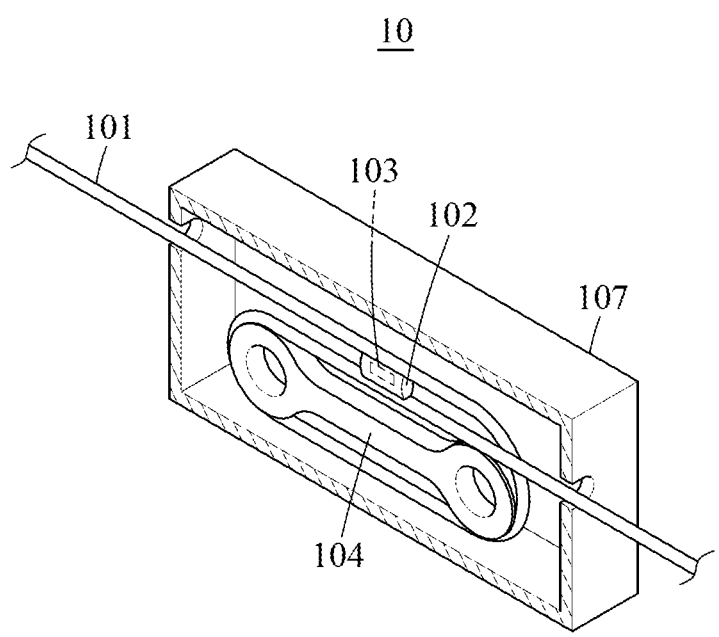
FIG. 5 is a schematic view of a temperature detection device according to an embodiment.
Figure 6:
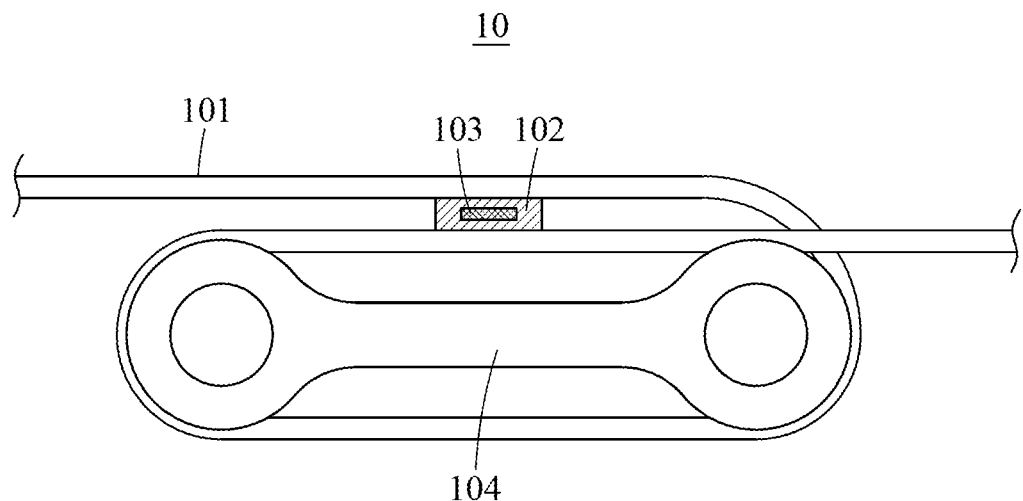
FIG. 6 is a plan view of the temperature detection device according to an embodiment.
Figure 7:
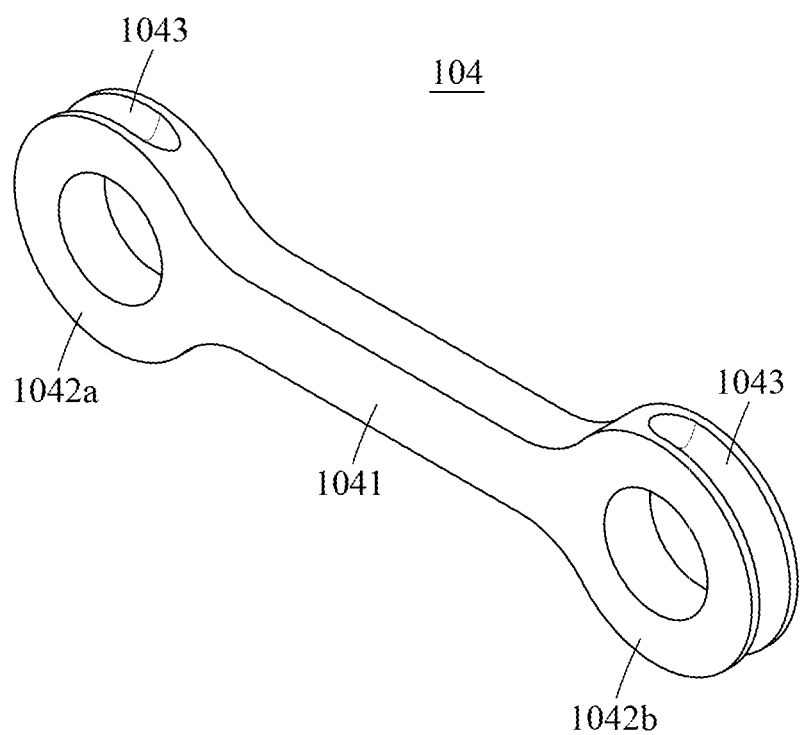
FIG. 7 is a perspective view of a jig according to an embodiment.
Figure 8:
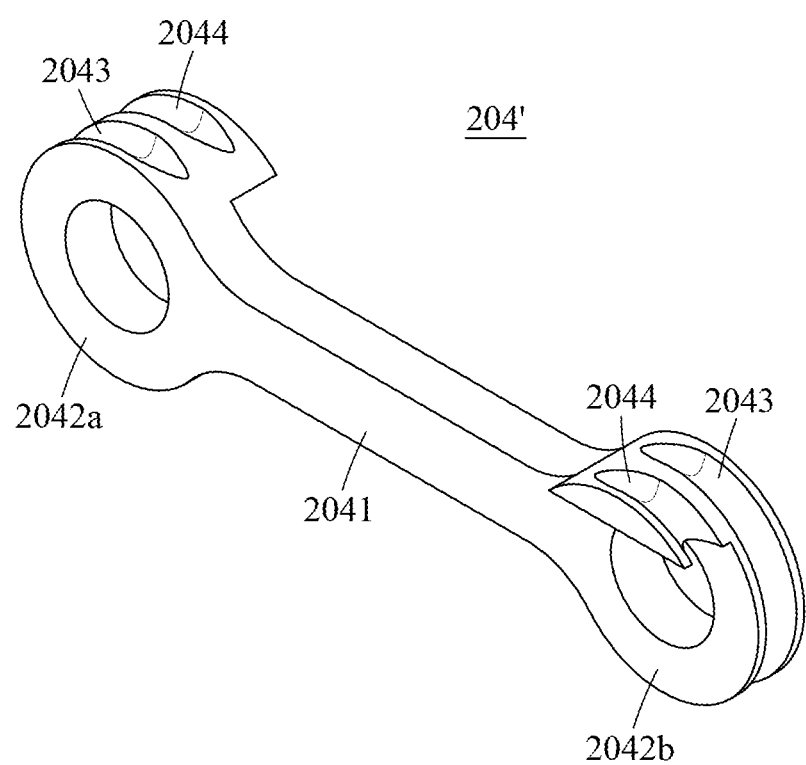
FIG. 8 is a perspective view of a jig according to an embodiment.

FIG. 5 is a schematic view of a temperature detection device according to an embodiment, FIG. 6 is a plan view of the temperature detection device according to an embodiment, and FIGS. 7 and 8 are perspective views of jigs according to embodiments.

Referring to FIGS. 5 to 7, the temperature detection device 10 according to the embodiment may include a tube 101, a jig 104, a connecting part 102, a temperature measurement sensor 103, and a heat-insulating housing 107.

The processing liquid may flow through the tube 101. The tube 101 may have a fluid channel formed therein and may provide a flow path along which the processing liquid moving toward the substrate W from the processing liquid dispensing apparatus flows. The tube 101 may contain a material that is able to be bent, for example, a flexible material. Accordingly, the tube 101 may be bent by the jig 104, which will be described below, so as to have a predetermined shape. For example, the tube 101 may be bent such that a plurality of portions including a first portion 101a and a second portion 101b have lengthwise directions parallel to each other.

The jig 104 may maintain the shape of the tube 101. The tube 101 may be wound around the outer circumferential surface of the jig 104. For example, the tube 101 may be wound around the outer surface of the jig 104 at least one time such that different portions, specifically, the first portion 101a and the second portion 101b have lengthwise directions parallel to each other. In this case, the jig 104 may perform a function of fixing the bent shape of the tube 101 by maintaining the shape of the tube 101, which is wound around the outer surface of the jig 104, in a predetermined state.

The jig 104 may include support parts 1042 and a bridge 1041.

The support parts 1042 may include a pair of support parts 1042a and 1042b. The pair of support parts 1042a and 1042b may be spaced apart from each other. The tube 101 may be brought into contact with the outer surfaces of the support parts 1042. The support parts 1042 may include a curved surface. For example, the support parts 1042 may have a circular cross-sectional shape with respect to a direction perpendicular to the lengthwise direction of the tube 101. In this case, the tube 101 may be wound around the jig 104 along the curved surfaces of the support parts 1042. In other words, the tube 101 may be sequentially wound around the outer circumferential surfaces of the pair of support parts 1042a and 1042b and may therefore be wound such that the first portion 101a and the second portion 101b have lengthwise directions parallel to each other.

Seating grooves 1043 may be formed on the outer surfaces of the support parts 1042. The seating grooves 1043 may be concavely formed on the outer surfaces along the curved surfaces of the support parts 1042. The tube 101 wound around the support parts 1042 may be inserted into the seating grooves 1043. In this case, the seating grooves 1043 may be formed in a shape corresponding to the shape of the outer surface of the tube 101.

The bridge 1041 may connect the pair of support parts 1042a and 1042b. The bridge 1041 may have a lengthwise direction parallel to the tube 101 wound around the jig 104. The interval between the pair of support parts 1042a and 1042b may be adjusted depending on the length of the bridge 1041. The bridge 1041 may have a smaller width than the pair of support parts 1042a and 1042b. In this case, the bridge 1041 and the tube 101 may be spaced apart from each other with respect to the state in which the tube 101 is wound around the jig 104. According to this structure, heat conduction from the tube 101 to the bridge 1041 may be minimized because the bridge 1041 does not make contact with the first portion 101a and the second portion 101b of the tube 101 on which temperature measurement is performed.

In summary, the jig 104 may have a structure that prevents an escape of heat for temperature measurement by minimizing contact with the tube 101 while maintaining the bent shape of the tube 101 for temperature measurement. The jig 104 may contain a material with low thermal conductivity.

Opposite sides of the connecting part 102 may adhere to the two portions of the tube 101. For example, the opposite sides of the connecting part 102 may be connected to the first portion 101a and the second portion 101b of the tube 101, which have lengthwise directions parallel to each other, in the state in which the tube 101 is bent by being wound around the jig 104. The connecting part 102 may be located between the pair of support parts 1042a and 1042b. The connecting part 102 may contain a material with high thermal conductivity, for example, an epoxy material. Accordingly, the connecting part 102 may directly receive, through heat conduction, heat from the first portion 101a and the second portion 101b of the tube 101 to which the connecting part 102 adhere.

The temperature measurement sensor 103 may be disposed inside the connecting part 102. The temperature measurement sensor 103 may be located between the two portions of the tube 101 that adhere to the connecting part 102, that is, between the first portion 101a and the second portion 101b of the tube 101. The temperature measurement sensor 103 may measure the temperature of the processing liquid in the tube 101 by using heat transferred from the two portions of the tube 101.

The heat-insulating housing 107 may surround the jig 104, the portion of the tube 101 wound around the jig 104, and the connecting part 102, with respect to the state in which the tube 101 is wound around the jig 104. The heat-insulating housing 107 may prevent heat from escaping to the outside from the portion of the tube 101 on which temperature measurement is performed. The heat-insulating housing 107 may contain a heat-insulating material, for example, polyethylene, Teflon, rubber, or the like and may interrupt an escape of heat from the heat-insulating housing 107 to the outside through heat convection. Accordingly, most of heat generated from the first portion 101a and the second portion 101b of the tube 101 may be transferred to the temperature measurement sensor 103 inside the connecting part 102 through heat conduction.

Referring to FIG. 8, a jig 204' may have a structure in which a plurality of seating grooves 2043 and 2044 are formed along the outer surfaces of support parts 2042a and 2042b to allow a tube to be wound a plurality of times.

The plurality of seating grooves 2043 and 2044 formed on the support parts 2042 may be spaced apart from each other at a predetermined interval. For example, the adjacent seating grooves 2043 and 2044 may be spaced apart from each other at an interval ranging from 2.3 mm to 2.7 mm. Accordingly, one tube may be inserted into the plurality of seating grooves 2043 and 2044, and therefore a first portion and a second portion may be spaced apart from each other at the interval between the seating grooves 2043 and 2044.

In summary, the temperature detection device according to the embodiment may indirectly measure the temperature of the processing liquid for substrate processing, thereby preventing a substrate from being damaged due to melted metal. Simultaneously, the temperature detection device may be brought into contact with a plurality of points of the tube to effectively transfer heat from the processing liquid to the temperature measurement sensor, thereby detecting the temperature of the processing liquid with accuracy similar to that in a direct measurement method.

The temperature detection device according to the embodiment is capable of preventing contamination of the processing liquid in the temperature measurement process.

The temperature detection device according to the embodiment is capable of detecting accurate temperature while using the indirect measurement method.

Effects of the temperature detection device according to the embodiment are not limited to the aforementioned effects, and any other effects not mentioned herein will be clearly understood from the following description by those skilled in the art to which the present invention pertains.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for detecting temperature, the device comprising:
   a tube through which a processing liquid for substrate processing flows;
   a jig having an outer circumferential surface around which the tube is wound, wherein the jig maintains a shape of a portion of the tube which is wound around the outer circumferential surface of the jig in a predetermined state; and
   a temperature measurement sensor installed adjacent to an outer surface of the tube wound around the jig, wherein the temperature measurement sensor senses a temperature of the processing liquid flowing through the tube;
   wherein the jig includes:
     a pair of support parts, each of which includes a curved surface, wherein the pair of support parts are spaced apart from each other; and
     a bridge to connect the pair of support parts,
     wherein the tube is sequentially wound around the curved surfaces of the pair of support parts.

2. The device of claim 1, wherein the tube is wound around an outer surface of the jig at least one time such that a plurality of different portions of the tube have lengthwise directions parallel to each other.

3. The device of claim 1, further comprising:
   a connecting part having opposite sides connected to outer surfaces of different portions of the tube wound around the jig,
   wherein the temperature measurement sensor is disposed inside the connecting part.

4. The device of claim 1, wherein the bridge has a smaller width than the pair of support parts, and
   wherein the tube is spaced apart from the bridge in a state of being wound around the jig.

5. The device of claim 1, wherein the temperature measurement sensor is installed on an outer surface of a tube portion located between the pair of support parts.

6. The device of claim 1, further comprising:
   a heat-insulating housing containing a heat-insulating material,
   wherein the heat-insulating housing surrounds the jig and the tube portion wound around the jig.

7. The device of claim 1, wherein each of the support parts includes a seating groove that is concavely formed along the curved surface and into which the tube is inserted.

8. The device of claim 7, wherein the support part includes a plurality of seating grooves formed thereon, and the seating grooves are spaced apart from each other.

* * * * *